C. VALLONE.
JOINT FOR THE TUBES OF BEDSTEAD AND OTHER FRAMES.
APPLICATION FILED JULY 1, 1910.
1,021,437.
Patented Mar. 26, 1912.
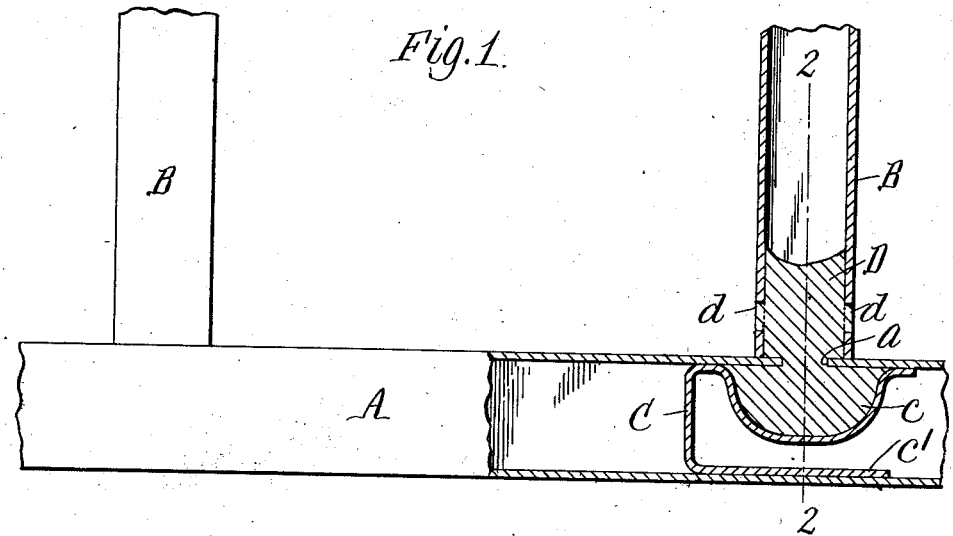
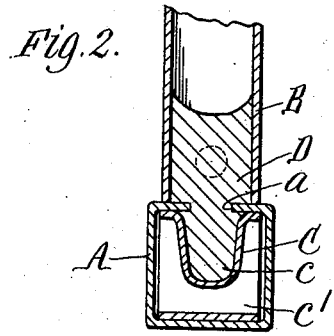
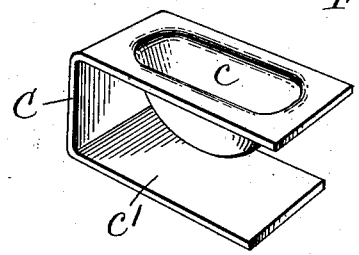
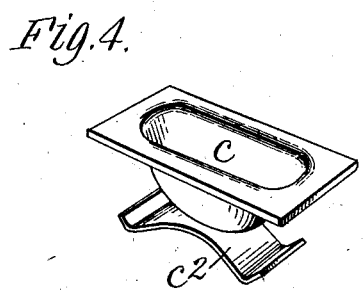
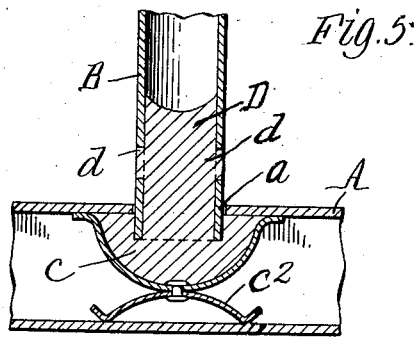
Witnesses:
E. A. Vock.
C. H. Bund.
Inventor
Charles Vallone
by Wilhelm Parker Hand
Attorneys.

UNITED STATES PATENT OFFICE.

CHARLES VALLONE, OF BUFFALO, NEW YORK, ASSIGNOR TO BARCALO MANUFACTURING COMPANY, OF BUFFALO, NEW YORK.

JOINT FOR THE TUBES OF BEDSTEAD AND OTHER FRAMES.

1,021,437.     Specification of Letters Patent.     Patented Mar. 26, 1912.

Application filed July 1, 1910. Serial No. 569,889.

*To all whom it may concern:*

Be it known that I, CHARLES VALLONE, a citizen of the United States, residing at Buffalo, in the county of Erie and State of New York, have invented a new and useful Improvement in Joints for the Tubes of Bedstead and other Frames, of which the following is a specification.

This invention relates more particularly to that type of joints or connections for the tubes of metal bedstead frames and other frames composed of tubes, in which the end of one tube is permanently secured to another tube extending at an angle thereto by a casting or plug which is contained within the meeting portions of the tubes. In thus joining the tubes a hole is made in the side of one tube where the other tube is to join it and a mold is secured in the tube opposite said hole. The other tube is held by suitable means with its end in or surrounding said hole in the first tube and molten metal is poured through a suitable opening or openings, provided for this purpose, into the cavity formed by said mold and the meeting portions of the tubes, thus forming the internal casting or plug which secures the tubes together.

The object of this invention is to improve, simplify and cheapen the production of joints of this character by providing a mold for the formation of the joint-casting or plug which can be quickly and easily placed in operative position in the tubes and which is of simple and inexpensive construction.

In the accompanying drawings: Figure 1 is a fragmentary elevation, partly in section, of a tubular frame having tube joints embodying the invention. Fig. 2 is a section thereof in line 2—2, Fig. 1. Fig. 3 is a detached perspective view of one of the molds employed in the construction shown in Figs. 1 and 2. Fig. 4 is a detached perspective view of a mold of slightly modified construction. Fig. 5 is a section of a joint of slightly modified construction.

Like reference characters refer to like parts in the several figures.

A represents one tube, for instance the lower horizontal tube, of a metal bedstead end frame or analogous tubular frame, and B B represent, for example, the upright tubes of the frame which are joined at their lower ends to the tube A between the ends thereof. The tube A is provided in one side with a hole $a$ at the point where each tube B is to join it, and the tube B can be placed with its end surrounding the hole $a$ and abutting against the side of the tube A, as shown in Figs. 1 and 2, or the end of the tube B can be inserted into the tube A through the hole $a$, as shown in Fig. 5. When the tubes B are of relatively large diameter as compared with the tube A the former arrangement is preferred, whereas if small tubes B are used a stronger joint is produced by inserting the ends of the tubes B in the hole $a$.

C represents a mold having a molding cavity or chamber $c$. One of these molds is placed in the tube A with its cavity or chamber $c$ opposite to and facing each of the holes $a$ in the side thereof. The edges of the mold C bounding the mold cavity $c$ bear against the wall of the tube A around the hole $a$, thus forming in the tube A a molding chamber or cavity. This chamber or cavity and the end of the tube B, which communicates therewith, are then filled with molten metal, poured in through one or more holes $d$, preferably in the end of the tube B, while the tubes are held in position in a suitable form or holder to form the connecting casting or plug D. As the metal fills the molding chamber or cavity, which is larger than the hole $a$, and the pouring holes $d$ in the tube B, the plug D is interlocked with both tubes and firmly secures them together.

The mold C is provided with a yielding or spring tongue or part adapted to bear against the interior surface of the tube A at one side thereof and hold the mold in place by friction with the mouth of the mold surrounding the hole $a$ in the tube. The mold is preferably made by stamping or drawing from sheet metal and the spring holding part can consist, as shown in Figs. 1–3, of an integral tongue or extension $c'$ of the blank from which the mold is formed. This tongue extends from one end of the mold and is bent so that its free end is opposite to the body of the mold and is adapted to bear on that wall of the tube which is opposite to the wall having the hole $a$ so as to press the mouth of the mold firmly against the wall of the tube around the hole $a$. Instead of making the holding tongue or part integral with the body of the mold it can be made of a separate piece $c^2$ fixed centrally to the mold, as shown in Fig. 4, and adapted to bear at its opposite free ends against the wall of the tube.

The mold made in either of the forms described can be quickly adjusted in position in the tube by simply pushing it along in the tube until its cavity is opposite to the hole $a$. The holding tongue does not prevent the mold from being readily pushed along to the required position in the tube and it will retain it in any position to which it is moved. The molds can therefore be positioned in the tube with much greater rapidity and with less labor than molds which have a screw or other fastening device requiring to be manipulated to secure the mold in place. As the molds are permanently retained in the tube by the cast joint-plugs D, it is important that they be of cheap construction and light so as not to unnecessarily add to the expense of manufacture and the weight of the frame. The molds constructed as described fulfil these requirements.

In the construction illustrated in the drawings the molds are made of the proper shape for use in square tubes. When the molds are to be used in round tubes their shape is changed sufficiently to make them conform properly to the round tubes.

I claim as my invention:

1. A mold for making cast joints for tubes which meet at an angle, comprising a body part having a molding cavity, and a yielding holding part which is fixed to the body part and is adapted to bear against the interior surface of the tube in which the mold is located and retain the mold in position by friction, due to the pressure of said yielding part against the tube, substantially as set forth.

2. A mold for making cast joints for tubes which meet at an angle, comprising a body part having a molding cavity, and a yielding tongue which is fixed to and projects from the body part and is adapted to frictionally engage the interior surface of the tube in which the mold is located to retain the mold in position, substantially as set forth.

3. The combination with a tube provided with a hole in the side thereof, a second tube which extends at an angle to the first tube and joins the latter at said hole, and an internal joint plug which connects said tubes, of a mold for said joint plug which is arranged in said tube having the hole and is provided with a yielding holding part that projects from the body of the mold and is adapted to frictionally engage the interior surface of the tube to retain the mold in position, substantially as set forth.

Witness my hand, this 29th day of June, 1910.

CHARLES VALLONE.

Witnesses:
 CHARLES L. HYSLOP,
 C. J. LEWIS.

---

Copies of this patent may be obtained for five cents each, by addressing the " Commissioner of Patents, Washington, D. C."